United States Patent [19]
Söhnlein et al.

[11] 3,774,476
[45] Nov. 27, 1973

[54] MULTIPLE SPEED ELECTRICAL HAND POWER TOOL SUCH AS ELECTRIC DRILL AND THE LIKE

[75] Inventors: Dieter Söhnlein, Kaufering; Ewald Merz, Utting, both of Germany

[73] Assignee: Metabowerke KG., Closs, Rauch & Schnitzler, Nurtingen, Germany

[22] Filed: Sept. 5, 1972

[21] Appl. No.: 286,574

[30] Foreign Application Priority Data
Sept. 9, 1971 Germany.................. P 21 45 009.9

[52] U.S. Cl. ................................................ 74/785
[51] Int. Cl. ............................................. F16h 3/48
[58] Field of Search....................... 74/785, 786, 787

[56] References Cited
UNITED STATES PATENTS

| | | | |
|---|---|---|---|
| 1,185,320 | 5/1916 | Holmes | 74/785 |
| 1,799,393 | 4/1931 | Rylander | 74/785 X |
| 3,115,791 | 12/1963 | Dean | 74/785 X |

Primary Examiner—Allan D. Herrmann
Attorney—Robert D. Flynn et al.

[57] ABSTRACT

A motor provides power over an output shaft (8) to which is geared a multiple speed reduction gearing, which includes a planetary drive including planet gears (15) and a planet gear carrier (13). A main gear (6) with outer and inner gear teeth (10, 11) thereon is driven by the motor shaft (4) gear teeth (10, 11) thereon, which are engaged by planetary gears (15) located on a planetary gear carrier. An outer axially shiftable ring (20) is shiftable to either connect the outer gear teeth (10) to the output shaft (8) over the planetary gear carrier, or the planetary gear (15) to the carrier, the latter drive being either fixed, or through a slip engagement to provide for two speed, or continuously variable speed output from the drive motor.

9 Claims, 4 Drawing Figures

PATENTED NOV 27 1973 3,774,476

MULTIPLE SPEED ELECTRICAL HAND POWER TOOL SUCH AS ELECTRIC DRILL AND THE LIKE

The present invention relates to electric power tools and more particularly to hand-held small electric drills and the like which have a variable speed output.

Electric power tools, such as electric drills, percussion tools, and the like usually have a drive gear transmission which is geared to the output shaft or pinion of the motor. The gears used are customarily spur gears, worm drives, or the like. If the output shaft is to provide more than one speed, and the motor is essentially a single speed motor, then it has been customary to so form the gear transmission that gear wheels can be interchanged, or can be selectively engaged and disengaged in order to provide for the desired transmission ratio. Such mechanical engagement and disengagement of gears require an idler shaft for the gear change transmission, which is comparatively expensive to build and requires additional space. To provide for reliable gear changing, as well as for long life of the gears and low noise level, tolerances in manufacture must be maintained with high accuracy. Hand-held power tools should be compact and small and the available space for the gearing is thus limited. The entire tool must be confined within a housing, the outer dimension of which is limited in order to permit ease of use.

It is an object of the present invention to provide an electric power tool, and more particularly a hand-held power tool which is so constructed that a multiple speed transmission is incorporated therein, which requires but little space, which is simple to manufacture permits change in speed within at least two ranges and which does not require high accuracy in manufacture for a large number of relatively located parts.

SUBJECT MATTER OF THE PRESENT INVENTION

Briefly, the output shaft of the motor is in driving engagement with a main gear which has coaxially arranged outer and inner gear teeth. A disk like planetary gear carrier, with at least one planetary gear thereon has a planetary gear in driving engagement with the inner and the outer gear teeth of the main gear. An axially shiftable selector ring is selectively engageable with one of the gear teeth, preferably the outer ones of the main gear to lock the outer one of the main gear to the planetary gear carrier; the planetary gear carrier is locked to the output shaft of the power tool. If the ring is shifted axially, engagement between the outer gear teeth and the planetary gear carrier is broken, and the ring will then engage the planetary gear only. This ring can be locked to the housing, or connected thereto by a slip coupling, so that the gearing ratio will then be determined by the transmission ratio between the inner gear (which is in driving engagement by means of a pinion with the planetary gear) and the slip, if any, between the axially shiftable ring and the housing.

The construction permits a substantial simplification of manufacture with respect to the customary spur gears with an idler shaft since only a single axial distance is critical — namely between the output shaft of the motor and the output shaft from the power tool; in contrast, gears having idler shafts require close tolerances of three shaft distances. The power tool with the gearing can be located in a small space and can be constructed with low weight, which is particularly important in hand-held power tools. Assembly and disassembly of the gearing, and of the tool as a whole is simple since the planetary gear carrier and the associated shaft, which also forms the output shaft of the tool can be inserted as a single unit into the housing of the electric power tool; in case of replacement, it can be removed as a single unit. The constructional tolerances for the unit are comparatively wide and the seat and the arrangement of the axially shiftable ring also is not critical and does not require small and accurately held relationships. This permits simple operation of the entire drive and ease of assembly and disassembly.

If the axially shiftable ring is not positively locked, but is engaged by a fraction drive, for example over a brakeshoe, then the output speed of the tool can be controlled by slip, and in step-less variation. In this case the axially shiftable ring, rather than being locked is only braked to provide for controlled slip with respect thereto. By suitable braking, that is, by suitable selection and control of the slip, it is possible to control the speed of the output spindle in a continuously variable mode.

The invention will be described by way of example with reference to the accompanying drawings, wherein:

Figure 1:
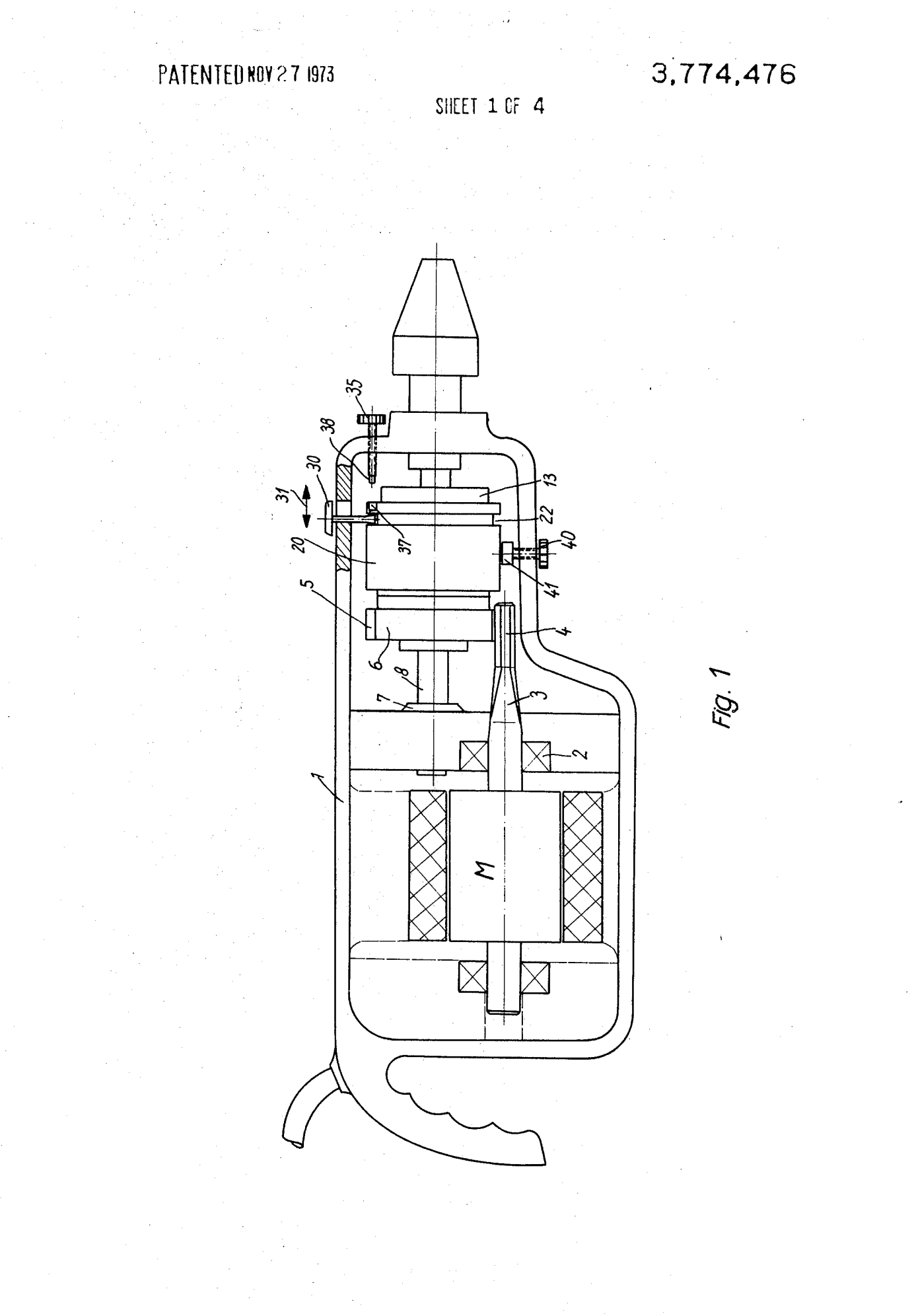

FIG. 1 illustrates an axial cross-sectional view of the power tool with the planetary gear drive;

Figure 2:
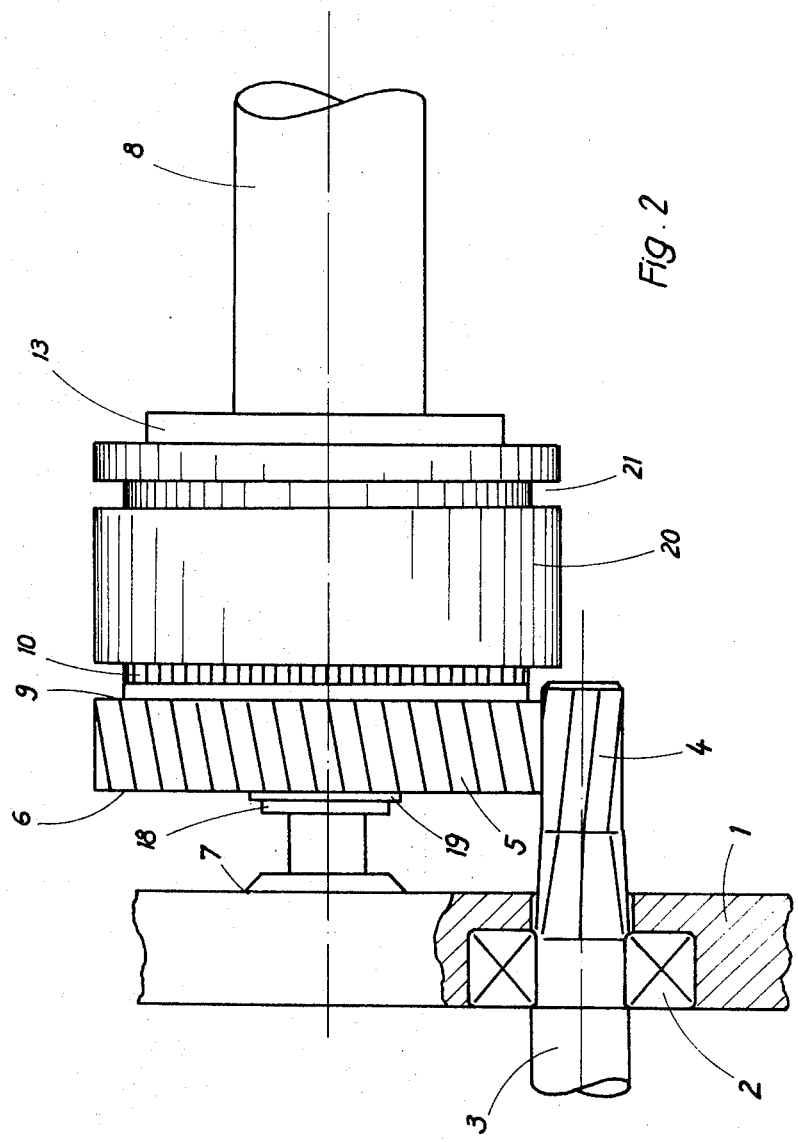
FIG. 2 is a side view of planetary gear drive of the power tool of FIG. 1.

The housing 1 of the tool has a bearing 2 located therein in which the output shaft 3 from the motor M is rotatably journalled. This bearing may, for example, be a roller bearing or a ball bearing and is only indicated schematically since the location and journalling of output shafts of electrically driven power tools are well known. The output shaft has a pinion, or gearing 4 at the end thereof, which gearing engages matching gearing 5 of main gear 6. Main gear 6 is journalled on a shaft 8, which forms the output shaft of the power tool which is journalled in a bearing 7, for example a sleeve bearing located within the housing 1 of the power tool. The main gear 6 provides rotational power to a planetary drive. To this end, one of the facing end sides, side 9, is formed with two coaxial gear teeth 10, 11. Gear teeth 10 are facing outwardly and gear teeth 11 are facing inwardly. In a simple way of construction, the main gear 6 is formed as a gear cylinder to which a ring 12, carrying the outer and inner gear teeth 10, 11 is secured, for example by spot welding, riveting or the like, to form a secure and reliable interconnection between ring 12 and gear 6.

A planet gear carrier 13 is located on shaft 8 and keyed thereto, for example by a key 14. Planet gear carrier 13 is placed immediately adjacent the main gear 6. Four planet gears 15 are located on the planetary gear carrier 13 on the side facing the main gear 6, the planetary gears 15 being journalled on shafts 16 and engaging a central pinion 17, which is rotatable about shaft 8. Central pinion 17 is in constant gearing engagement with the inner gearing 11 of the gear ring 12. Pinion 17 is thus in driving engagement with the main gear 6. It functions, simultaneously, as a spacer between the planetary gear carrier 13 and the main gear 6. The main gear 6 is located on shaft 8 by a C-ring 18 bearing against a washer 19.

Figure 3:
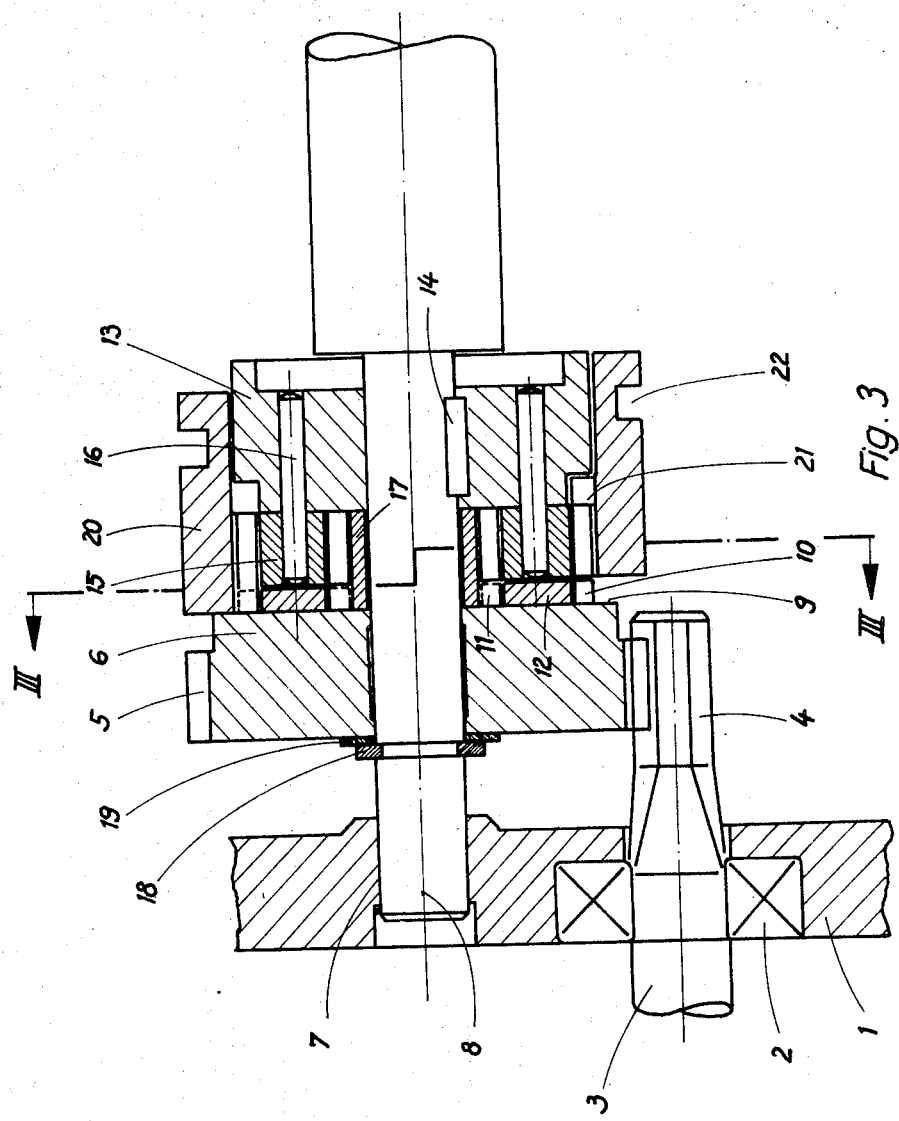
FIG. 3 is an axial cross-sectional view of the planetary gear drive of the power tool of FIG. 1.

An axially shiftable gear change switching ring 20 surrounds the planetary gear carrier 13. Switching ring 20 carries an inner gearing 21 which is in constant engagement with the planetary gears 15. Upon axial shifting towards the left — FIG. 3 — the inner gearing 21 can be engaged with the outer gear teeth 10 of the gear ring 12 secured to the main gear 6. Upon shifting to the right, driving engagement between ring 20 and the main gear 6 is disconnected. The two possible positions of the switching ring 20 are illustrated in FIG. 3, where the upper half (with respect to the center line of shaft 8) indicates the position of ring 20 when engaged with the gearing 10; the non-engaged position is illustrated in the lower half.

Switching ring 20 can be moved axially in a direction of arrow 31 by a shift knob 30 having a projection engaging in a groove 22 formed in ring 20.

Ring 20 can be locked to the housing 1 or can be permitted to rotate with respect thereto. A knob 35 is provided, secured to housing 1, for example by being threaded therein. A brakeshoe 41 on a bolt 40 which is threaded into the housing 1 is selectively engageable under pressure against the face of the ring 20. When the shiftknob 30 is shifted towards the right with respect to arrow 30, a projection 38 on knob 35 forming a locking pin engages in lock holes 37 to positively lock the ring 20.

Figure 4:
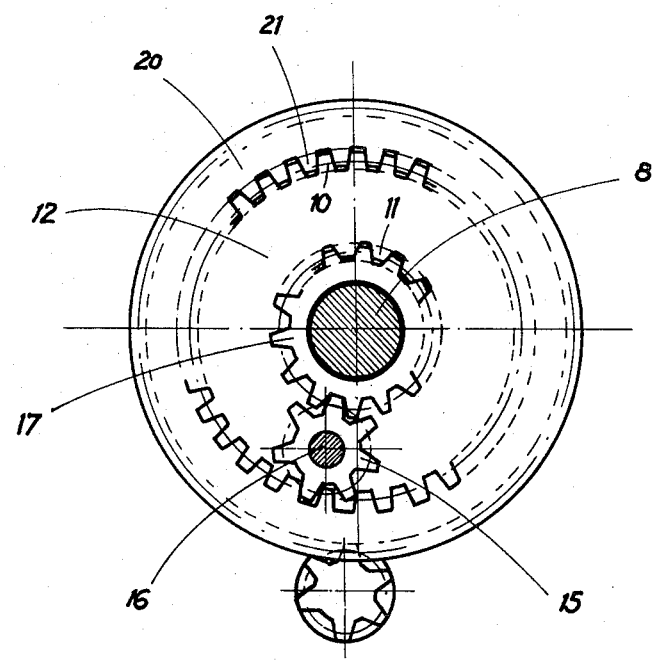
FIG. 4 is a transverse cross-sectional view along line III—III of FIG. 3.

Operation: Pinion 4, secured to the output shaft 3 of motor M is rotated by the motor, and drives gear 6, thus rotating the gear ring 12. Gear ring 12, in engagement with pinion 17, causes continuous rotation of pinion 17 (see FIG. 4). If the ring 20 is in the left axial position — the upper part of FIG. 3 — then the inner gearing 21 of ring 20 is engaged with the outer gear teeth 10 of gear ring 12. In effect, therefore, ring 20 rotates together with the main gear 6. The planetary gears 15 are locked in position and cannot rotate with respect to their shafts 16. Therefore, the planetary gear carrier 13 rotates with the same speed as gear 6. Shaft 8, keyed by means of key 14 to the planetary gear carrier 13 rotates likewise with the same speed as main gear 6.

If the switching ring 20 is shifted to the right, as illustrated in the lower half of the center line of shaft 8 in FIG. 3, then the drive connection between switching ring 20 and the main gear 6 is released. Planetary gears 15 now can rotate on the gearing of the pinion 17 and on the inner teeth 21 of the ring 20. Since the planetary gear carrier 13 is keyed to shaft 4, a step down gearing transmission will be effected between the main gear 6 and the planetary gear carrier 13 due to the step-down transmission provided by engagement of the inner gear teeth 11 with the pinion 17 and the further connection between the pinion 17 and the planetary gears 15 as they rotate about pinion 17. Ring 20, in this position, is fixed in space, for example by engagement of the projection of the knob 35 within opening 37.

Alternatively, by first screwing knob 35 to the right (FIG. 1) and then tightening bolt 40 ring 20 can be brought in frictional engagement with the brakeshoe 41, permitting, however, some slip. By suitable adjustment of the slip, the speed of drive shaft 8 can be suitably controlled, in a continuous and step-less manner.

Various changes and modifications may be made within the inventive concept; for example, the switching ring 20 need not be located at the outer circumference of the planetary gear carrier 13 so that it is engaged with the outer gear teeth 10 of the gear ring 12; rather, the switching ring 20 could be formed as a central sleeve which is engaged with the inner gear teeth 11 of the gear ring 12, and the function of pinion 17 could be obtained by a gear ring having inwardly projecting teeth, similar to ring 20, and located in axial position.

The gear transmission is particularly suitable for small tools but can be utilized for various apparatus in which space is at a premium, and assembly and disassembly must be rapid and simple and weight and cost should be held to a minimum.

We claim:

1. Electric multi-speed hand tool having a motor (M) and a motor output shaft (3) providing motor output power;

a motor speed reduction gearing in driving engagement with the motor output shaft (3) comprising a main gear (6), in driving engagement with the motor shaft and having coaxial outer (10) and inner (11) teeth thereon;

a disk-like planetary gear carrier (13) having at least one planetary gear (15) located thereon;

an outer, axially shiftable (31) ring (20) located coaxially to the main gear (6) and having gearing (21) thereon in continuous meshing engagement with the planetary gear (15), the ring being selectively engageable with one of the gear teeth (10, 11) of the main gear (6) in one axial position and disengaged therefrom in a second axial position;

and means (38, 41, 37) restraining rotation of the selectively engageable axially shiftable ring (20) when in the second axial position with respect to the planetary gear carrier (13).

2. Tool according to claim 1, wherein the rotation restraining means comprises a positive engagement lock.

3. Tool according to claim 1, wherein the rotation restraining means comprises a brakeshoe (41) permitting restrained, relative slip between the planetary gear carrier (13 and the ring (20) to provide speeds intermediate the direct drive speed effected when the ring is in the first axial position and the low speed when the ring is in the second axial position.

4. Tool according to claim 1, wherein the main gear comprises a ring shaped element (6) having, at one face thereof (9), a gear ring (12) secured thereto, said gear ring carrying the inner and outer gear teeth (10, 11);

and a spur gear (17) in meshing engagement with the inner gear teeth (11) and further in meshing engagement with the planetary gears (15).

5. Tool according to claim 4, wherein the spur gear (17) is a pinion and has a length approximately equal to the sum of the axial length of the inner gear teeth (11) and of the planetary gear to provide a spacer member for the gear.

6. Tool according to claim 1, wherein the shiftable outer ring (20) is journalled on the planetary gear carrier (13) for rotary and axially shiftable movement with respect thereto.

7. Tool according to claim 1, further comprising an output shaft (8) journalled in the tool, said output shaft being coupled to the planetary gear carrier (13) for rotation therewith, the main gear (6) being rotatably journalled on the output shaft for rotation with respect thereto.

8. Tool according to claim 1, including a motor gear (4) on the output shaft of the motor (M) and gearing (4, 5) coupled to the main gear (6) and the motor gear; and an output shaft (8) journalled in the tool and in driven engagement with the planetary gear carrier.

9. Tool according to claim 1, comprising an output shaft (8) journalled in the tool and coupled (14) to the planetary gear carrier (13) for rotation therewith, the main gear (6) being journalled on the output shaft for rotation with respect thereto and including a ring-shaped element having the outer (10) and inner (11) gear teeth projecting from one face (9) thereof;

and a spur gear (17) journalled on the output shaft and in engagement with both the inner gear teeth (11) of the main gear and with the planetary gears (15), so that, when the axially shiftable ring (20) is in the first axial position, the outer gear teeth (10) on the main gear and the planetary gears (15) will be locked together, the planetary gear carrier (13) transmitting direct drive motion to the output shaft; and when the axially shiftable ring (20) is in the second axial position, the planetary gears (15) will be restrained with respect to the planetary gear carrier (13) and rotation will be transmitted by the inner teeth (11) to the spur gear (17) and the output speed of the output shaft (8) will be determined by the gearing ratio of the inner teeth (11) and the spur gear, and of the spur gear (17) and the planetary gears (15) and the degree of relative restraint between the planetary gear carrier (13) and the shiftable ring (20).

* * * * *